(12) United States Patent
Land et al.

(10) Patent No.: US 8,482,544 B2
(45) Date of Patent: Jul. 9, 2013

(54) NEGATIVE PIXEL COMPENSATION

(75) Inventors: Brian Richards Land, Redwood City, CA (US); Marduke Yousefpor, San Jose, CA (US); Steven Porter Hotelling, San Jose, CA (US)

(73) Assignee: Apple Inc., Cupertino, CA (US)

( * ) Notice: Subject to any disclaimer, the term of this patent is extended or adjusted under 35 U.S.C. 154(b) by 732 days.

(21) Appl. No.: 12/500,870

(22) Filed: Jul. 10, 2009

(65) Prior Publication Data
US 2011/0006832 A1    Jan. 13, 2011

(51) Int. Cl.
*H03K 17/96* (2006.01)
(52) U.S. Cl.
USPC ............................. 345/174; 345/173; 178/18.06
(58) Field of Classification Search
USPC .................... 345/173, 174; 178/18.01, 18.03, 178/18.06
See application file for complete search history.

(56) References Cited

U.S. PATENT DOCUMENTS

| | | | |
|---|---|---|---|
| 5,483,261 A | 1/1996 | Yasutake |
| 5,488,204 A | 1/1996 | Mead et al. |
| 5,825,352 A | 10/1998 | Bisset et al. |
| 5,835,079 A | 11/1998 | Shieh |
| 5,880,411 A | 3/1999 | Gillespie et al. |
| 6,075,520 A | 6/2000 | Inoue |
| 6,188,391 B1 | 2/2001 | Seely et al. |
| 6,310,610 B1 | 10/2001 | Beaton et al. |
| 6,323,846 B1 | 11/2001 | Westerman et al. |
| 6,690,387 B2 | 2/2004 | Zimmerman et al. |
| 7,015,894 B2 | 3/2006 | Morohoshi |
| 7,184,064 B2 | 2/2007 | Zimmerman et al. |
| 7,372,455 B2 | 5/2008 | Perski et al. |
| 7,663,607 B2 | 2/2010 | Hotelling et al. |

(Continued)

FOREIGN PATENT DOCUMENTS

| | | |
|---|---|---|
| EP | 2 196 889 A2 | 6/2010 |
| EP | 2 196 889 A3 | 6/2010 |

(Continued)

OTHER PUBLICATIONS

International Search Report mailed Sep. 14, 2010, for PCT Application No. PCT/US2010/041247, four pages.

(Continued)

*Primary Examiner* — Amare Mengistu
*Assistant Examiner* — Jennifer Zubajlo
(74) *Attorney, Agent, or Firm* — Morrison & Foerster LLP

(57) ABSTRACT

Negative pixel compensation in a touch sensitive device is disclosed. The device can compensate for a negative pixel effect in touch signal outputs due to poor grounding of an object touching the device. To do so, the device can switch to a configuration to measure the grounding condition of the touching object and use the measurement to compensate the touch output values from the device accordingly. In the switched configuration, a first set of lines of the device can be switched between a coupling to a stimulation signal input to drive the device, a coupling to a capacitance signal output to output a signal indicative of the object's grounding condition, and a coupling to ground. A second set of lines of the device can be coupled to a touch signal output to output a signal indicative of the object's touch at the device. In addition or alternatively, in the switched configuration, the first set of lines of the device can be switched to function as the second set of lines and vice versa. The grounding signal can be applied to the touch signal to compensate for the negative pixel effect.

24 Claims, 10 Drawing Sheets

U.S. PATENT DOCUMENTS

| | | | |
|---|---|---|---|
| 2004/0155871 A1 | 8/2004 | Perski et al. | |
| 2005/0259085 A1 | 11/2005 | Baker et al. | |
| 2006/0026521 A1 | 2/2006 | Hotelling et al. | |
| 2006/0097991 A1 | 5/2006 | Hotelling et al. | |
| 2006/0197753 A1 | 9/2006 | Hotelling | |
| 2008/0158167 A1* | 7/2008 | Hotelling et al. | 345/173 |
| 2008/0208324 A1 | 8/2008 | Glithero et al. | |
| 2009/0160787 A1* | 6/2009 | Westerman et al. | 345/173 |
| 2009/0174676 A1 | 7/2009 | Westerman | |
| 2009/0174688 A1 | 7/2009 | Westerman | |
| 2010/0060608 A1 | 3/2010 | Yousefpor | |
| 2010/0097343 A1* | 4/2010 | Fang | 345/174 |
| 2010/0149110 A1 | 6/2010 | Gray | |
| 2012/0081335 A1 | 4/2012 | Land | |

FOREIGN PATENT DOCUMENTS

| | | |
|---|---|---|
| EP | 2 335 140 A1 | 6/2011 |
| JP | 2000-163031 A | 6/2000 |
| JP | 2002-342033 A | 11/2002 |
| WO | WO-2004/070396 A2 | 8/2004 |
| WO | WO-2004/070396 A3 | 8/2004 |
| WO | WO-2011/005884 A1 | 1/2011 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

U.S. Appl. No. 12/208,324, filed Sep. 10, 2008, by M. Yousefpor.

U.S. Appl. No. 12/234,520, filed Sep. 19, 2008, by M. Yousefpor et al.

Great Britain Search Report mailed Dec. 21, 2011, for GB Patent Application No. GB1119963.5, two pages.

Non-Final Office Action mailed Mar. 21, 2012, for U.S. Appl. No. 13/251,049, filed Sep. 30, 2011, 16 pages.

* cited by examiner

NEGATIVE PIXEL COMPENSATION

FIELD

This relates generally to touch sensitive devices and, more particularly, to compensating for negative pixel effects on touch sensitive devices.

BACKGROUND

Many types of input devices are presently available for performing operations in a computing system, such as buttons or keys, mice, trackballs, joysticks, touch sensor panels, touch screens and the like. Touch sensitive devices, such as touch screens, in particular, are becoming increasingly popular because of their ease and versatility of operation as well as their declining price. A touch sensitive device can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. The touch sensitive device can allow a user to perform various functions by touching the touch sensor panel using a finger, stylus or other object at a location often dictated by a user interface (UI) being displayed by the display device. In general, the touch sensitive device can recognize a touch event and the position of the touch event on the touch sensor panel, and the computing system can then interpret the touch event in accordance with the display appearing at the time of the touch event, and thereafter can perform one or more actions based on the touch event.

When the object touching the touch sensor panel is poorly grounded, touch output values indicative of a touch event can be erroneous or otherwise distorted. The possibility of such erroneous or distorted values can further increase when two or more simultaneous touch events occur at the touch sensor panel.

SUMMARY

This relates to compensating touch signals indicative of a touch at a touch sensitive device for errors that can be caused by poor grounding of a user or other objects touching the device. One such error can be a negative pixel effect, in which an apparent negative amount of touch can be sensed by the device during multiple simultaneous touches. To compensate for this effect, the device can obtain measurements that can be used to determine and apply a compensation factor to the touch signals. For example, the device can switch to a configuration for concurrently measuring the grounding condition of the touching object and the object's touch at the device. The device can then calculate the compensation factor based on a ratio between the grounding measurement and the touch measurement and apply the factor to the touch signals to compensate for the negative pixel effect. Alternatively, the device can switch to a first configuration to measure the grounding condition of the touching object and to a second configuration to measure the object's touch at the device.

The touch sensitive device can include multiple pixels formed by crossings of a first set of lines and a second set of lines, where the first set of lines can be drive lines configured to drive the device and the second set of lines can be sense lines configured to sense a touch at the pixels of the device. Alternatively, the first and second sets of lines can switch positions so that the first lines function as the sense lines and the second lines function as the drive lines. To configure the device to compensate for the negative pixel effect, the drive and sense lines of the device can be switched between various coupling states in order to measure the object's touch and grounding condition. The coupling states can include a coupling to a stimulation signal input to drive the device, a coupling to a capacitance signal output to output a signal indicative of the object's grounding condition, a coupling to ground, and a coupling to a touch signal output to output a signal indicative of the object's touch at the device. The device can apply an outputted grounding signal to an outputted touch signal to compensate for the negative pixel effect.

DETAILED DESCRIPTION

Figure 1:
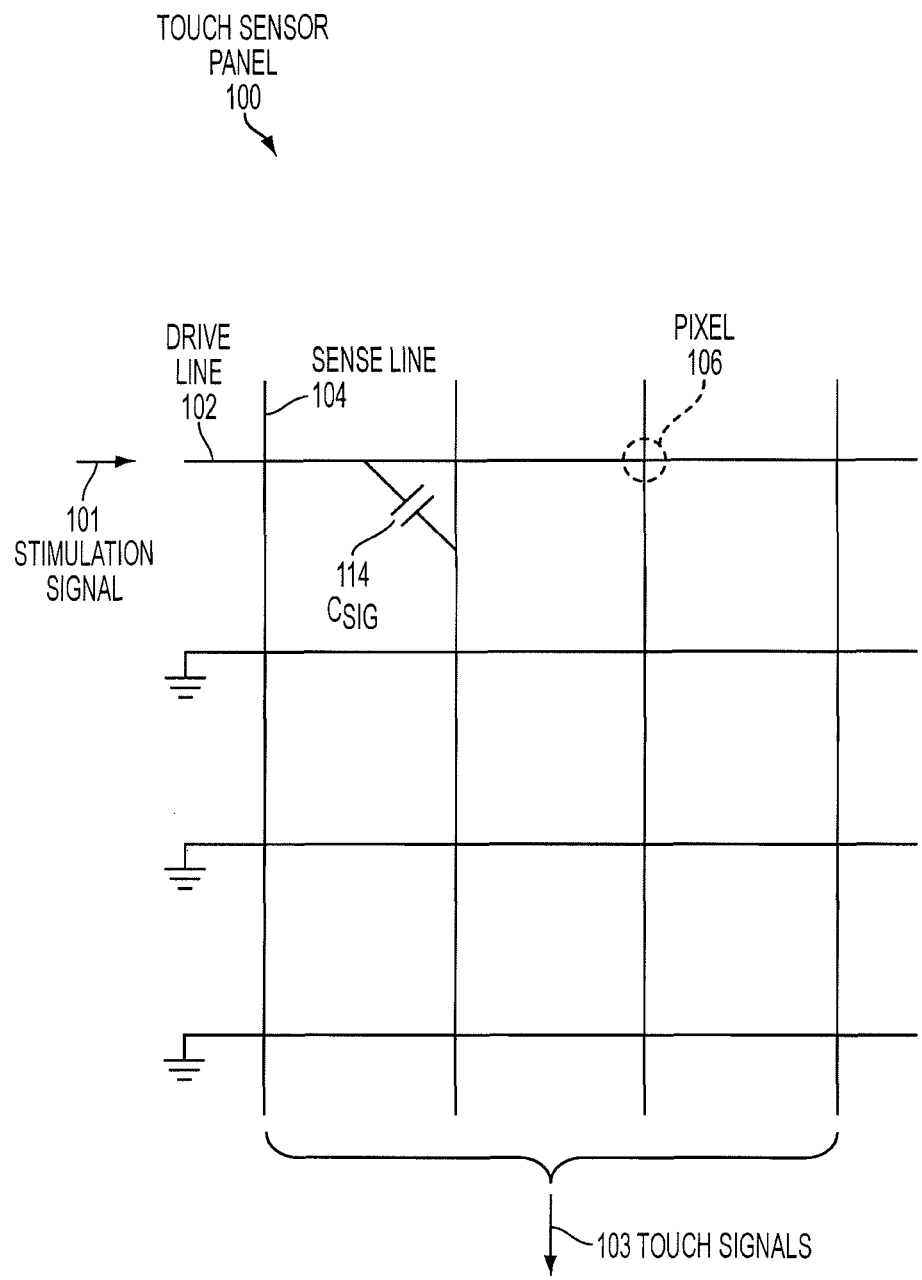
FIG. 1 illustrates an exemplary touch sensor panel in a normal touch detection configuration according to various embodiments.

In the following description of various embodiments, reference is made to the accompanying drawings which form a part hereof, and in which it is shown by way of illustration specific embodiments which can be practiced. It is to be understood that other embodiments can be used and structural changes can be made without departing from the scope of the various embodiments.

This relates to compensating for a negative pixel effect in a touch sensitive device due to poor grounding of a user or other objects touching the device. The device can be configured to concurrently measure a touching object's grounding condition and the object's touch at the device. In addition or alternatively, the device can be configured to sequentially measure the touching object's grounding condition and the object's touch at the device. The device can calculate a compensation factor based on a ratio between the grounding measurement and the touch measurement and use the factor to compensate for erroneous or distorted touch output values from the device. Various components of the device can be switchably configured according to the particular configuration.

In some embodiments, a configuration can include one or more drive lines of the device being switched to couple to a stimulation signal to drive the device, other drive lines being switched to couple to a sensor to measure a grounding condition of the touching object, the remaining drive lines being switched to couple to ground, and one or more sense lines of the device being switched to couple to a sensor to measure a touch at the device. In this configuration, the device can concurrently measure the grounding condition and the touch at the device. Alternatively, the device can just measure the grounding condition.

In some embodiments, another configuration can include one or more of the drive lines being switched to couple to a stimulation signal to drive the device, the other drive lines being switched to couple to ground, and one or more sense lines being switched to couple to a sensor to measure a touch at the device. In this configuration, the device can measure the object's touch.

In some embodiments, another configuration can include the drive lines of the device being switched to function as the sense lines of the device and vice versa, where one or more drive lines can be switched to couple to a stimulation signal to drive the device, other drive lines can be switched to couple to a sensor to measure a grounding condition, the remaining drive lines can be switched to couple to ground, and the sense lines can be switched to couple to ground. In this configuration, the device can measure the grounding condition.

The ability to measure a negative pixel effect in a touch sensitive device can advantageously provide more accurate and faster touch detection by not having to repeat measurements subject to poor grounding conditions. Power savings can also be realized by not having to repeat measurements. Additionally, the device can more robustly adapt to various grounding conditions of a user or other object.

The terms "poorly grounded," "ungrounded," "not grounded," "not well grounded," "improperly grounded," "isolated," and "floating" can be used interchangeably to refer to poor grounding conditions that can exist when an object is not making a low impedance electrical coupling to the ground of the touch sensitive device.

The terms "grounded," "properly grounded," and "well grounded" can be used interchangeably to refer to good grounding conditions that can exist when an object is making a low impedance electrical coupling to the ground of the touch sensitive Although various embodiments can be described and illustrated herein in terms of mutual capacitance touch sensor panels, it should be understood that the various embodiments are not so limited, but can be additionally applicable to self-capacitance sensor panels, both single and multi-touch sensor panels, and other sensors in which single stimulation signals can be used to generate a touch signal and in which multiple simultaneous stimulation signals can be used to generate a composite touch signal. Moreover, although various embodiments can be described and illustrated herein in terms of double-sided ITO (DITO) touch sensor panels, it should be understood that the various embodiments can be also applicable to other touch sensor panels configurations, including opaque touch sensor panels, such as configurations in which the drive and sense lines can be formed on different substrates or on the back of a cover glass, and configurations in which the drive and sense lines can be formed on the same side of a single substrate. Furthermore, although various embodiments can be described and illustrated herein in terms of rows and columns of conductive lines orthogonal to each other, it should be understood that the various embodiments are not so limited, but additionally encompass other geometric configurations, such as concentric and radial lines of a polar-coordinate configuration, diagonal lines of an oblique configuration, non-orthogonal lines, and so on.

FIG. 1 illustrates an exemplary touch sensor panel in a normal touch detection configuration according to various embodiments. In the example of FIG. 1, touch sensor panel 100 can include an array of pixels 106 that can be formed at the crossing points of row lines 102 and column lines 104. Each pixel 106 can have an associated mutual capacitance Csig 114 formed between the crossing row lines 102 and column lines 104. As illustrated in FIG. 1, the row lines 102 can function as drive lines and the column lines 104 can function as sense lines, where the drive lines can be stimulated by stimulation signals 101 provided by drive circuitry (not shown) that can include an alternating current (AC) waveform and the sense lines can transmit touch or sense signals 103, indicative of a touch at the panel 100, to sense circuitry (not shown) that can include a sense amplifier for each sense line.

To sense a touch at the panel 100, in some embodiments, multiple drive lines 102 can be substantially simultaneously stimulated by the stimulation signals 101 to capacitively couple with the crossing sense lines 104, thereby forming a capacitive path for coupling charge from the drive line to the sense line. The crossing sense lines 104 can output signals representing the coupled charge or current. While some drive lines 102 are being stimulated, the other drive lines can be coupled to ground. In other embodiments, each drive line 102 can be sequentially stimulated by the stimulation signals 101 to capacitively couple with the crossing sense lines 104, which can output signals representing the coupled charge or current, while the other drive lines can be coupled to ground. In still other embodiments, there can be a combination of multiple drive lines 102 being substantially simultaneously stimulated and single drive lines being sequentially stimulated.

When a well grounded user's finger (or other object) touches the panel 100, the finger can cause the capacitance Csig 114 to reduce by an amount $\Delta$Csig at the touch location. This capacitance change $\Delta$Csig can be caused by charge or current from the stimulated drive line 102 being shunted through the touching finger to ground rather than being coupled to the crossing sense line 104 at the touch location. The touch signals 103 representative of the capacitance change $\Delta$Csig can be transmitted by the sense lines 104 to the sense circuitry for processing. The touch signals 103 can indicate the pixel where the touch occurred and the amount of touch that occurred at that pixel location.

When a poorly grounded user's finger (or other object) touches the panel 100, a finger capacitance Cfd to the stimulated drive line 102, a finger capacitance Cfs to the crossing sense line 104 at the touch location, and a finger capacitance Cgnd to user ground can form a secondary capacitive path for coupling charge from the drive line to the sense line. Some of the charge generated by the stimulated drive line 102 and transmitted through the finger can be coupled via the secondary capacitive path back into the crossing sense line 104, rather than to ground. As a result, instead of the capacitance Csig 114 of the pixel at the touch location being reduced by $\Delta$Csig, Csig may only be reduced by ($\Delta$Csig−Cneg), where Cneg can represent a so-called "negative capacitance" resulting from the charge coupled into the crossing sense line due to the finger's poor grounding. The touch signals 103 can still generally indicate the pixel where the touch occurred but with an indication of a lesser amount of touch than actually occurred.

When multiple poorly grounded user's fingers (or other objects) simultaneously touch the panel 100 at different locations, the first finger capacitances Cfd and Cfs can form as described above at the first finger's touch location, i.e., a crossing of a stimulated drive line 102 and a sense line 104. Some of the charge from the first finger can also be coupled through the second finger back into the panel 100 so that the second finger capacitances Cfd and Cfs can form at the second finger's touch location, i.e., at a crossing of an unstimulated drive line 102 and a sense line 104. The capacitance to user ground Cgnd can also form as described above. As a result, the touch signals 103 can indicate the pixel where the first finger touched but with an indication of a lesser amount of touch than actually occurred, as described previously. The touch signals 103 can also indicate a phantom touch at the pixel formed by the crossing of the stimulated drive line 102 and the second finger's sense line 104 and/or at the pixel formed by the crossing of the second finger's unstimulated drive line and the first finger's sense line. The touch signals 103 can indicate an apparent negative amount of touch at these pixels, due to the charge coupled back into the panel by the second finger. This can be the so-called "negative pixel effect."

Similarly, when the drive line 102 at the touch location of the second finger is stimulated, the second finger capacitances Cfd and Cfs can form as described above at that touch location. Some of the charge from the second finger can also be coupled through the first finger back into the panel 100 so that the first finger capacitances Cfd and Cfs can form at the first finger's touch location, i.e., at the crossing of its now unstimulated drive line 102 and a sense line 104. The capacitance to user ground Cgnd can also form. As a result, the touch signals 103 can indicate the pixel where the second finger touched but with an indication of a lesser amount of touch than actually occurred, as described previously. The touch signals 103 can also indicate a phantom touch at the pixel formed by the crossing of the stimulated drive line 102 and the first finger's sense line 104 and/or at the pixel formed by the crossing of the first finger's unstimulated drive line and the second finger's sense line and an apparent negative amount of touch at these pixels, due to the charge coupled back into the panel 100 by the first finger, thereby generating the negative pixel effect.

As an alternate embodiment to the row lines as drive lines and the column lines as sense lines described previously, the row lines 102 can function as sense lines and the column lines 104 can function as drive lines. When well grounded or poorly grounded fingers touch the panel, the column lines can perform as the drive lines described above and the row lines can perform as the sense lines described above.

Figure 2:
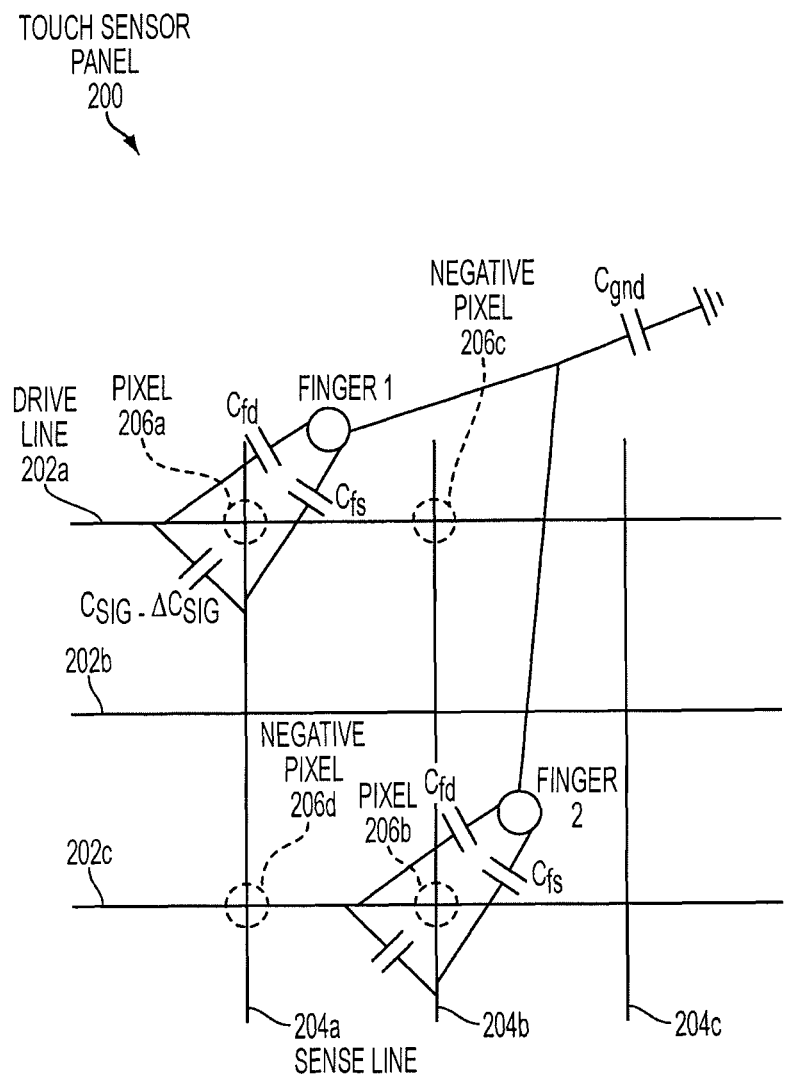
FIG. 2 illustrates an exemplary negative pixel effect in a touch sensor panel receiving multiple simultaneous touches of poorly grounded fingers according to various embodiments.

FIG. 2 illustrates an exemplary negative pixel effect in a touch sensor panel receiving multiple simultaneous touches of poorly grounded fingers according to various embodiments. As illustrated in FIG. 2, the row lines 202 can function as drive lines and the column lines 204 can function as sense lines. In other embodiments, the row lines 202 can function as sense lines and the column lines 204 can function as drive lines. In the example of FIG. 2, a poorly grounded first finger (symbolically illustrated by a circle and identified as "finger 1") can touch at pixel 206a of touch sensor panel 200 and a poorly grounded second finger (symbolically illustrated by a circle and identified as "finger 2") can touch at pixel 206b of the panel. When drive (or row) line 202a of the panel 200 is stimulated, the capacitance along a first path between the drive line 202a and sense (or column) line 204a can be (Csig−ΔCsig). Because the fingers are poorly grounded, a second capacitive path can form between the drive line 202a and the sense line 204a, having capacitances Cfd (between the drive line 202a and the first finger) and Cfs (between the sense line 204a and the first finger), and a third capacitive path can form via the second finger between the drive line 202c and the sense line 204b, having capacitances Cfd (between the drive line 202c and the second finger) and Cfs (between the sense line 204b and the second finger). A capacitance Cgnd can also form between the fingers and user ground. The capacitances can be due to charge or current acquired by the first finger from the stimulated drive line 202a being coupled back into the panel 200 at pixels 206a and 206b, rather than being shunted to ground. Similar capacitances can form at the first and second fingers when drive line 202c is stimulated. As a result, pixels 206c and 206d, which are proximate to the touched pixels 206a and 206b but did not receive touches, can indicate a negative amount of touch ("negative pixels").

Accordingly, detecting the negative pixel effect and compensating the touch signals for the effect can improve touch sensing of the touch sensor panel in poor grounding conditions.

Figure 3:
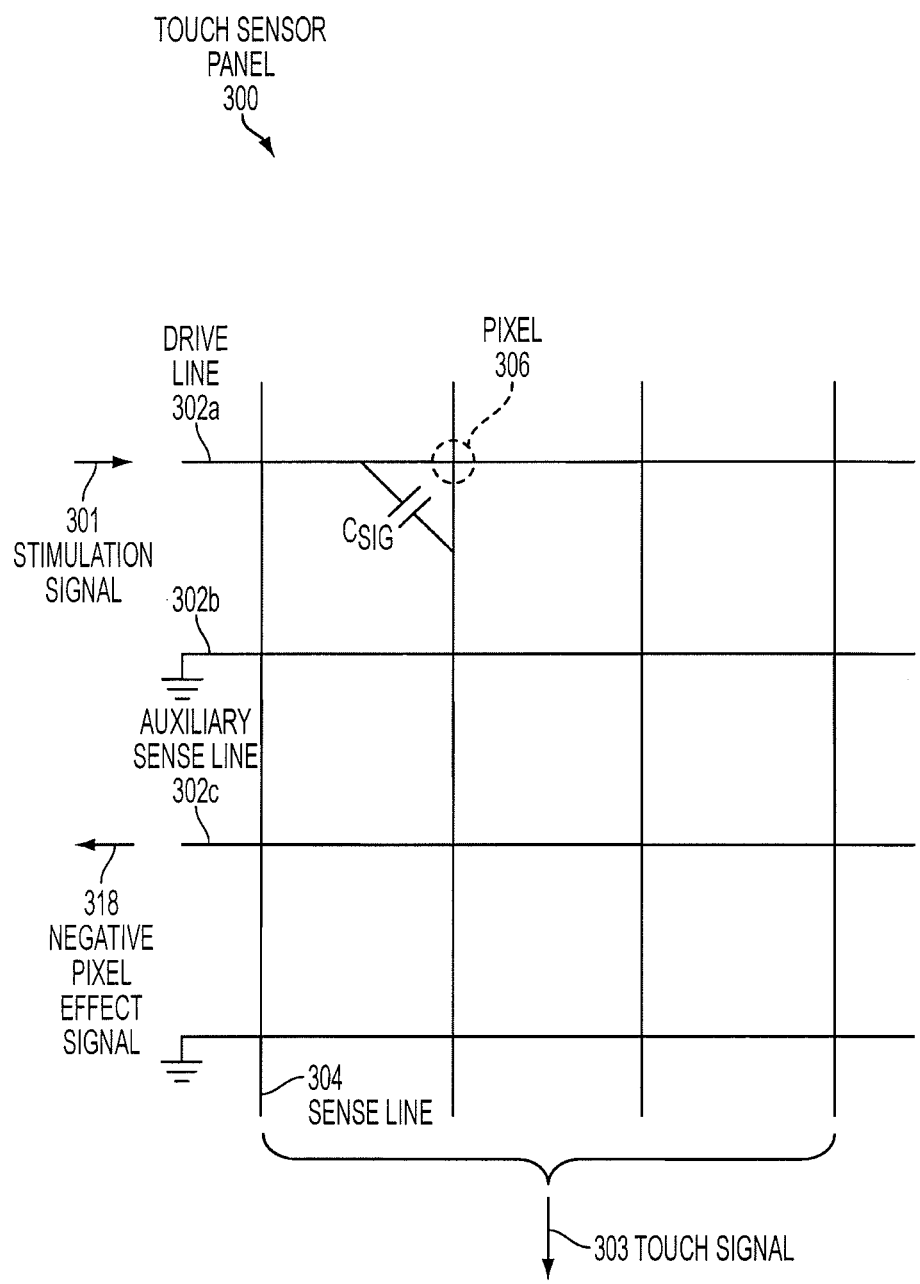
FIG. 3 illustrates an exemplary touch sensor panel in a negative pixel effect detection configuration according to various embodiments.

FIG. 3 illustrates an exemplary touch sensor panel in a negative pixel effect detection configuration according to various embodiments. Touch sensor panel 300 of FIG. 3 can be similar to the touch sensor panel 100 of FIG. 1 with the following additions. Rather than all unstimulated drive (or row) lines 302b coupling to ground, some unstimulated drive lines 302c can switchably couple to sensors (not shown) to detect a capacitance Cfd on these drive lines that can contribute to the negative pixel effect. The capacitance can be due to charge or current coupled into these drive lines from poorly grounded fingers touching the panel 300 and can be representative of the user's grounding condition. The sensors for sensing the capacitances Cfd can include sense amplifiers. These drive lines can be switched and can change function to become auxiliary sense lines 302c.

To detect the capacitances Cfd, multiple drive lines 302 can be substantially simultaneously stimulated by the stimulation signals 301 (as in drive line 302a), some of the unstimulated drive lines can be coupled to ground (as in drive line 302b), and others of the unstimulated drive lines can be switched to function as auxiliary sense lines coupled to sensors to sense negative pixel effect signal 318, indicative of the capacitances Cfd (as in drive lines 302c). An auxiliary sense line 302c can form a capacitance Cfd from a second (third, fourth, or fifth) poorly grounded finger touching at that auxiliary sense line, thereby allowing charge or current to couple with that auxiliary sense line to form the capacitance Cfd, as described previously. Conversely, when a finger is not touching at an auxiliary sense line 302c, that auxiliary sense line may not form a capacitance Cfd to be sensed. The negative pixel effect signals 318 can be transmitted to sense circuitry for further processing in compensating for the negative pixel effect. In some embodiments, touch signals 303 from the sense lines 304 can be transmitted to sense circuitry for further processing. As such, both touch signals 303 and negative pixel effect signals 318 can be captured concurrently. In some embodiments, touch signals 303 from the sense lines 304 can be transmitted to ground.

In other embodiments, each drive line 302 can be sequentially stimulated by the stimulation signals 301 to capacitively couple with the crossing sense lines 304, which can output signals representing the coupled charge or current, while the other drive lines can be either switched to function as auxiliary sense lines or coupled to ground. In still other embodiments, there can be a combination of multiple drive lines 302 being substantially simultaneously stimulated and single drive lines being sequentially stimulated.

Although FIG. 3 illustrates the row lines as drive lines and auxiliary sense lines and the column lines as sense lines, it is to be understood that the row lines can function as sense lines and the column lines can function as drive lines and auxiliary sense lines.

Selection of which unstimulated drive lines 302 to use as auxiliary sense lines 302c can be made to insure that a sufficient number of quality capacitance Cfd measurements are captured so that the negative pixel effect can be adequately compensated for. In some embodiments, even numbered unstimulated drive lines 302 disposed in rows of the panel 300 above or before a stimulated drive line and odd numbered unstimulated drive lines disposed in rows below or after the stimulated drive line can be selected for use as auxiliary sense lines 302c. In some embodiments, odd numbered unstimulated drive lines 302 in rows of the panel 300 before a stimulated drive line and even numbered unstimulated drive lines in rows after the stimulated drive line can be selected for use as auxiliary sense lines 302c. In some embodiments, only the unstimulated drive lines 302 in the rows after a stimulated drive line can be selected for use as auxiliary sense lines 302c. In some embodiments, only the unstimulated drive lines 302 in rows before a stimulated drive line can be selected for use as auxiliary sense lines 302c. In some embodiments, all the unstimulated drive lines 302 can be selected for use as auxiliary sense lines 302c. In some embodiments, alternate unstimulated drive lines 302 before and after a stimulated drive line (excluding those unstimulated drive lines immediately adjacent to the stimulated drive line) can be selected for use as auxiliary sense lines 302c. Other selection schemes capable of capturing the capacitances Cfd can also be used according to the needs of the panel.

Figure 4:
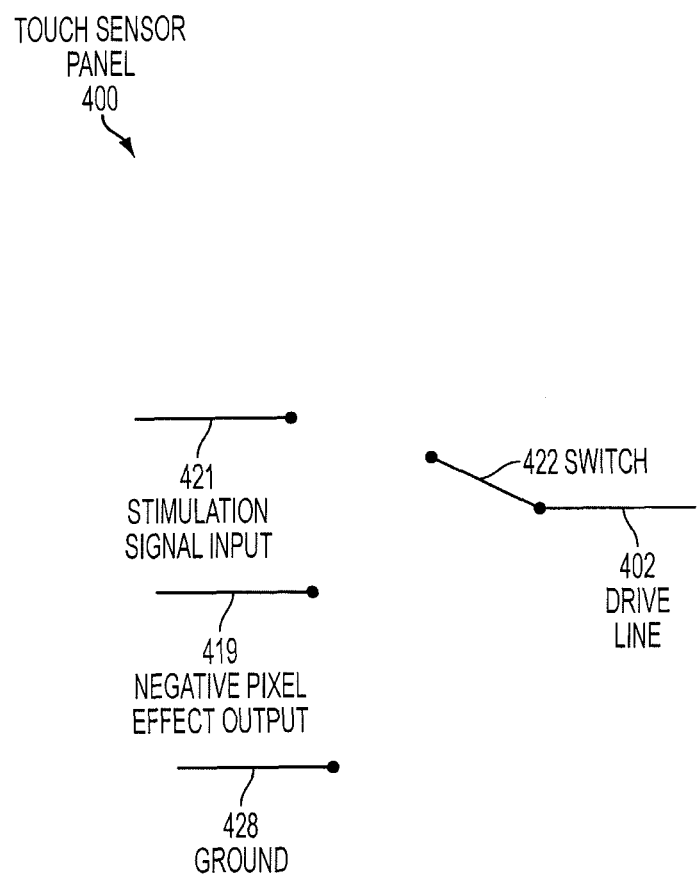
FIG. 4 illustrates exemplary switching circuitry of a touch sensor panel according to various embodiments.

A touch sensor panel according to various embodiments can form both a normal touch detection configuration, as in FIG. 1, and a negative pixel effect detection configuration, as in FIG. 3. To do so, the drive lines of the touch sensor panel can be configured to switch between a stimulation signal input, a negative pixel effect signal output, and a ground coupling. FIG. 4 illustrates exemplary switching circuitry of a touch sensor panel according to various embodiments that can switch between these configurations. In the example of FIG. 4, drive line 402 can have an associated switch 422, which can couple the drive line to stimulation signal input line 421, negative pixel effect signal output line 419, and ground 428. In normal touch detection configuration, the switch 422 can couple the drive line 402 to either the stimulation signal input line 421 when the drive line is to be stimulated or ground 428 when the drive line is not to be stimulated. In negative pixel effect detection configuration, the switch 422 can couple the drive line 402 to either the stimulation signal input line 421 when the drive line is to be stimulated, the negative pixel effect signal output line 419 when the drive line is to be an auxiliary sense line, or ground when the drive line is not to be either stimulated or an auxiliary sense line.

The switching circuitry for only one drive line is illustrated in FIG. 4. However, it is to be understood that the same or similar circuitry can be used for the remaining drive lines of the touch sensor panel. In some embodiments, individual drive lines can have corresponding individual sensors for sensing negative pixel effect signals. In some embodiments, multiple drive lines can share a sensor for sensing negative pixel effect signals, where a switch can be configured to switch between the drive lines to selectively couple a drive line to the negative pixel effect signal output line of that sensor when that drive line transmits a negative pixel effect signal. Although the drive line in FIG. 4 is illustrated as a row line, it is to be understood that the drive line can be a column line.

In some embodiments, touch detection can be performed at the panel to capture touch signals indicative of a touch at the panel and then negative pixel effect detection can be performed at the panel to capture capacitances indicative of negative pixel effect on the captured touch signals. In such embodiments, the panel can switch the drive lines back and forth between the two configurations. Each time, the captured capacitances can be used to compensate the captured touch signals for the negative pixel effect. In some embodiments, touch detection and negative pixel effect detection can be performed concurrently. In such embodiments, the panel can switch the drive lines and the sense lines to that configuration.

Figure 5:
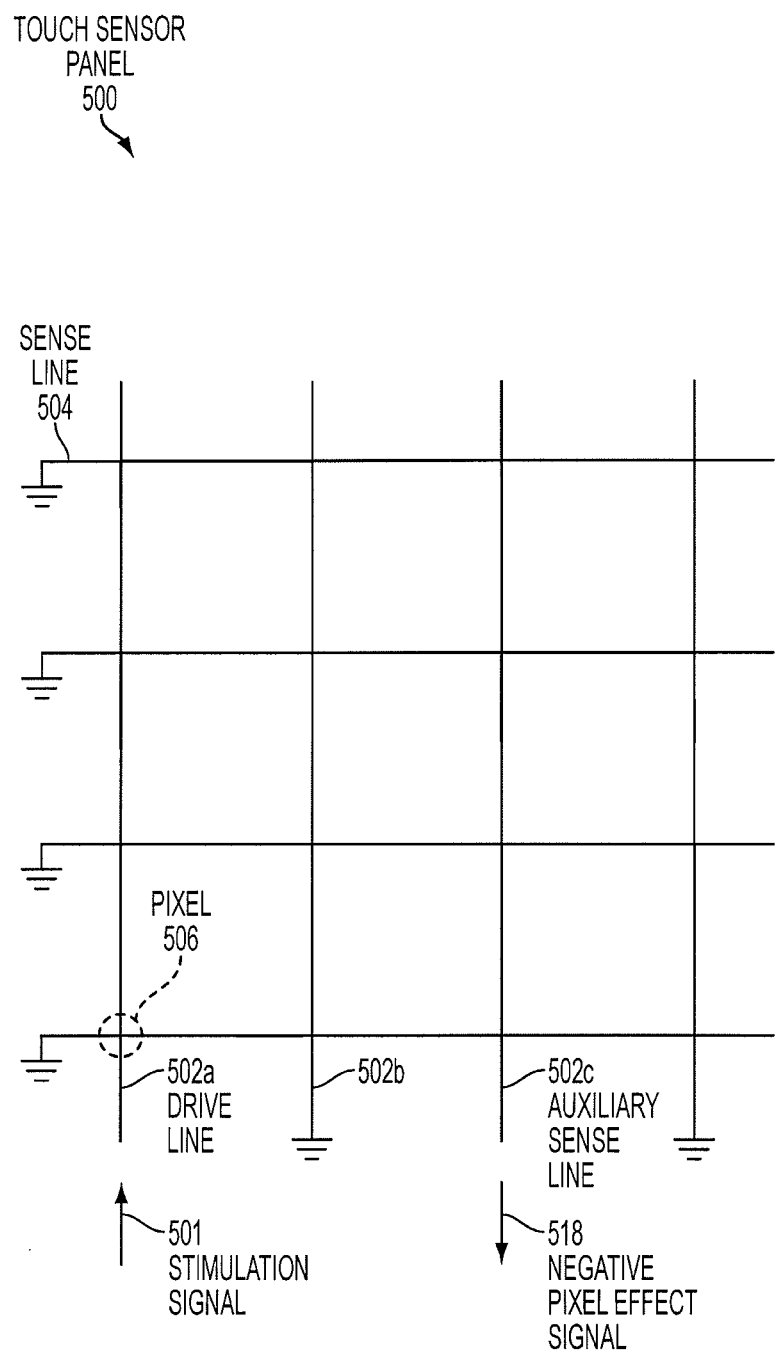
FIG. 5 illustrates another exemplary touch sensor panel in a negative pixel effect detection configuration according to various embodiments.

FIG. 5 illustrates another exemplary touch sensor panel in a negative pixel effect detection configuration according to various embodiments. Touch sensor panel 500 of FIG. 5 can be similar to the touch sensor panel 300 of FIG. 3 with the following additions. Rather than the row lines 502 functioning as drive lines and the column lines 504 functioning as sense lines, the row lines can function as sense lines and the column lines can function as drive lines. In effect, the drive and sense lines switch places. This configuration can be useful to detect capacitances Cfd' for touching fingers aligned in a row at the panel. Since the column lines function as drive lines in this switched configuration, the capacitance Cfd' between the fingers and the drive (or column) lines 502 can be comparable to the capacitance Cfs (as illustrated in the configuration of FIG. 2) between the fingers and the sense (or column) lines 204. Similar to the touch panel 300 of FIG. 3, some unstimulated drive (or column) lines 502c of FIG. 5 can switchably couple to sensors (not shown) to detect a capacitance Cfd' on these drive lines due to the negative pixel effect. These drive lines can be switched and can change function to become auxiliary sense lines 502c.

To detect the capacitances Cfd', multiple drive lines 502 can be substantially simultaneously stimulated by the stimulation signals 501 (as in drive line 502a), some of the unstimulated drive lines can be coupled to ground (as in drive line 502b), and other unstimulated drive lines can be used as auxiliary sense lines coupled to sensors to sense negative pixel effect signal 518, indicative of the capacitances Cfd' (as in drive lines 502c). An auxiliary sense line 502c can form a capacitance Cfd' from a second (third, fourth, or fifth) poorly grounded finger touching at that auxiliary sense line, thereby allowing charge to couple with that auxiliary sense line to form the capacitance Cfd', as described previously. Conversely, when a finger is not touching at an auxiliary sense line 502c, that auxiliary sense line may not form a capacitance Cfd' to be sensed. The negative pixel effect signals 518 can be transmitted to sense circuitry for further processing in compensating for the negative pixel effect. The sense (or row) lines 504 can be coupled to ground.

In other embodiments, each drive line 502 can be sequentially stimulated with the stimulation signals 501 to capacitively couple with the crossing sense lines 504, while the other drive lines 502 can be either switched to function as auxiliary sense lines or coupled to ground.

Selection of which unstimulated drive lines 502c to function as auxiliary sense lines can be made in the same or similar manner as described in FIG. 3.

In some embodiments, the touch sensor panel can use the configuration of FIG. 5 in conjunction with the configuration of FIG. 3 to capture the capacitances Cfd and Cfd'. For example, the touch sensor panel can form the configuration of FIG. 3 to capture the capacitances Cfd and then form the configuration of FIG. 5 to capture additional capacitances Cfd' that may not have been detectable from the FIG. 3 configuration. In some embodiments, the configuration of FIG. 5 can be optional.

Figure 6:
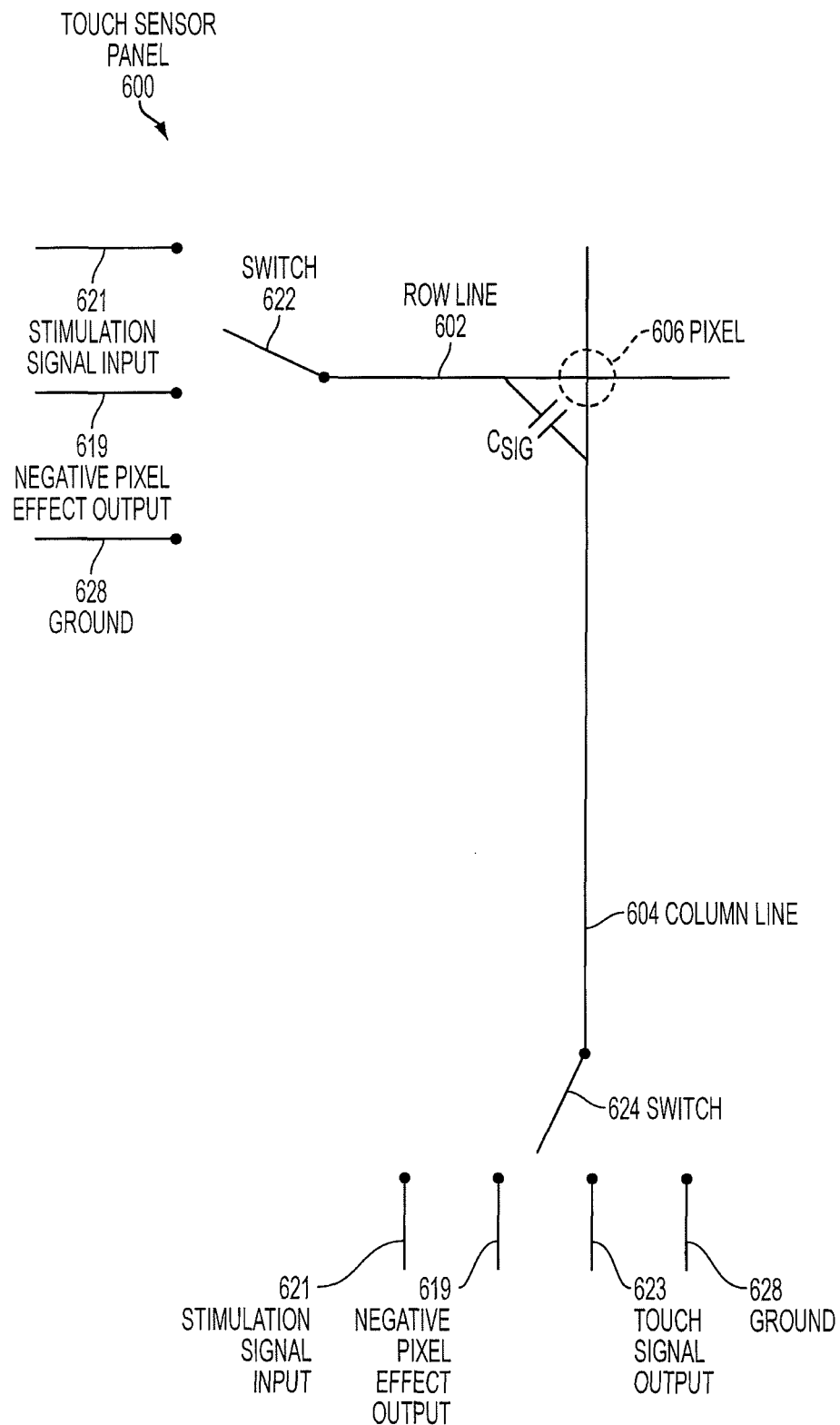
FIG. 6 illustrates exemplary switching circuitry of a touch sensor panel according to various embodiments.

A touch sensor panel according to various embodiments can form both a normal touch detection configuration, as in FIG. 1, and the negative pixel effect detection configurations, as in FIGS. 3 and 5. To do so, the lines in rows of the touch sensor panel can be configured to switch between a stimulation signal input, a negative pixel effect signal output, and a ground coupling. Similarly, the lines in columns of the touch sensor panel can be configured to switch between the stimulation signal input, the negative pixel effect signal output, a touch signal output, and a ground coupling. FIG. 6 illustrates exemplary switching circuitry of a touch sensor panel according to various embodiments that can switch between these configurations. In the example of FIG. 6, row line 602 can have an associated switch 622, which can couple the row line to stimulation signal input line 621, negative pixel effect signal output line 619, and ground 628. Column line 604 can have an associated switch 624, which can couple the column line to the stimulation signal input line 621, the negative pixel effect signal output line 619, ground 628, and touch signal output line 623. In normal touch detection configuration, as in FIG. 1, the row lines 602 can be drive lines and the column lines 604 can be sense lines. The switch 622 can couple the row line 602 to either the stimulation signal input line 621 when the row line is to be stimulated or ground 628 when the row line is not to be stimulated. The switch 624 can couple the column line 604 to the touch signal output line 623.

In negative pixel effect detection configuration, as in FIG. 3, the row lines 602 can be drive lines and the column lines 604 can be sense lines. The switch 622 can couple the row line 602 to either the stimulation signal input line 621 when the row line is to be stimulated, the negative pixel effect signal output line 619 when the row line is to be an auxiliary sense line, or ground when the row line is not to be either stimulated or an auxiliary sense line. The switch 624 can couple the column line 604 to either the touch signal output line 623 or to ground 628. In negative pixel effect detection configuration, as in FIG. 5, the row lines 602 can be sense lines and the column lines 604 can be drive lines. The switch 622 can couple the row line 602 to ground 628. The switch 624 can couple the column line 604 to either the stimulation signal input line 621 when the column line is to be stimulated, the negative pixel effect signal output line 619 when the column line is to be an auxiliary sense line, or ground when the column line is not to be either stimulated or an auxiliary sense line.

The switching circuitry for only one row line and one column line is illustrated in FIG. 6. However, it is to be understood that the same or similar circuitry can be used for the remaining row and column lines of the touch sensor panel. In some embodiments, individual lines can have corresponding individual sensors for sensing negative pixel effect signals. In some embodiments, multiple lines can share a sensor for sensing negative pixel effect signals, where a switch can be configured to switch between the lines to selectively couple a line to the negative pixel effect signal output line of that sensor when that line transmits a negative pixel effect signal.

It is to be understood that a touch sensor panel is not limited to the configurations described herein, but can include other configurations capable of detecting capacitances, indicative of grounding conditions, that can be used to compensate for negative pixel effect in the panel according to various embodiments.

The negative pixel effect can be approximately expressed in terms of the relationship between the measured touch signal value ΔCsig,m and the actual touch signal value ΔCsig,a at a pixel as follows, $$\Delta C_{sig,m}(i, j) = \Delta C_{sig,a}(i, j) - \frac{\sum_{all\_j} C_{fd}(i, j) \times \sum_{all\_i} C_{fs}(i, j)}{\sum_{all\_j,all\_i} C_{fd}(i, j) + \sum_{all\_j,all\_i} C_{fs}(i, j) + C_{gnd}} \quad (1)$$

where (i,j)=the location of the pixel formed by the crossing of drive line i and sense line j in the touch sensor panel;

$$\sum_{all\_j} C_{fd}(i, j) = \text{the sum of all finger to drive line capacitances } Cfd \text{ along drive line } i;$$

$$\sum_{all\_i} C_{fs}(i, j) = \text{the sum of all finger to sense line capacitances } Cfs \text{ along sense line } j;$$

$$\sum_{all\_j,all\_i} C_{fd}(i, j) = \text{the sum of all finger to drive line capacitances } Cfd \text{ in the touch sensor panel};$$

$$\sum_{all\_j,all\_i} C_{fs}(i, j) = \text{the sum of all finger to sense line capacitances } Cfs \text{ in the touch sensor panel};$$

and Cgnd=ground capacitance, which can be a function of the device capacitance and the user's capacitance, i.e., how well the user is grounded. The subtracted term in Equation (1) can represent the negative pixel effect.

Equation (1) can be rearranged as follows, $$\Delta C_{sig,a}(i, j) = \Delta C_{sig,m}(i, j) + R \times \sum_{all\_j} \Delta C_{sig,m}(i, j) \times \sum_{all\_i} \Delta C_{sig,m}(i, j), \quad (2)$$

where R=a negative pixel compensation factor, which can be a function of Cfd, Cfs, and Cgnd, thereby representative of a user's grounding condition;

$$\sum_{all\_j} \Delta C_{sig,m}(i, j) = \text{the sum of all measured touch signal outputs along drive line } i; \text{ and}$$

$$\sum_{all\_i} C_{sig,m}(i, j) = \text{the sum of all measured touch signal outputs along sense line } j.$$

The negative pixel compensation factor R can be approximated as follows, $$R = b \times \left(\frac{\sum S(i)}{\sum Z_m(i)}\right)_{all\_i}, \quad (3)$$

where b=a touch sensor panel design constant, which can be obtained through simulation and/or empirical measurements for a given panel sensing pattern design; S(i)=a cross product of the finger to drive line capacitances Cfd along auxiliary sense lines obtained when drive line i is stimulated in a negative pixel effect detection configuration; and Zm(i)=an estimated cross product of the finger to drive line capacitance Cfd along auxiliary sense lines using the measured touch signal values ΔCsig,m obtained from the regular sense lines when drive line i is stimulated in a normal touch detection configuration.

The cross product S(i) of the finger to drive line capacitances Cfd can be obtained when the touch sensor panel is in negative pixel effect detection configuration by stimulating a drive line i of the touch sensor panel with a stimulation signal and sensing a set of k unstimulated drive lines (i.e., auxiliary sense lines) (where k=any number less than or equal to the number of unstimulated drive lines), where S(j) can be expressed as follows, $$S(i) = \frac{\sum_{all\_j} C_{fd}(i,j) \times \sum_{all\_k,all\_j} C_{fd}(k,j)}{\sum_{all\_i,all\_j} C_{fd}(i,j) + \sum_{all\_i,all\_j} C_{fs}(i,j) + C_{gnd}}. \quad (4)$$

Similarly, the estimated cross product Zm(i) of the finger to drive line capacitances Cfd using the measured touch signal values ΔCsig,m can be obtained when the touch sensor panel is in touch detection configuration by stimulating a drive line i of the touch sensor panel with a stimulation signal and sensing touch signals on the sense lines, where Zm(i) can be expressed as follows, $$Z_m(i) = \sum_{all\_j} C_{fd,m}(i,j) \times \sum_{all\_k,all\_j} C_{fd,m}(k,j) = \quad (5)$$

$$a^2 \times \sum_{all\_j} \Delta C_{sig,m}(i,j) \times \sum_{all\_k,all\_j} \Delta C_{sig,m}(k,j),$$

where a=a touch sensor panel design constant, which can be obtained through simulation and/or empirical measurements for a given panel sensing pattern design.

Hence, by obtaining S(i) and Zm(i) and multiplying their sum ratios by the touch sensor panel design constant b as in Equation (3), the negative pixel compensation factor R can be determined. R can then be used to compensate for negative pixel effect at a pixel, as in Equation (2).

Figure 7A:
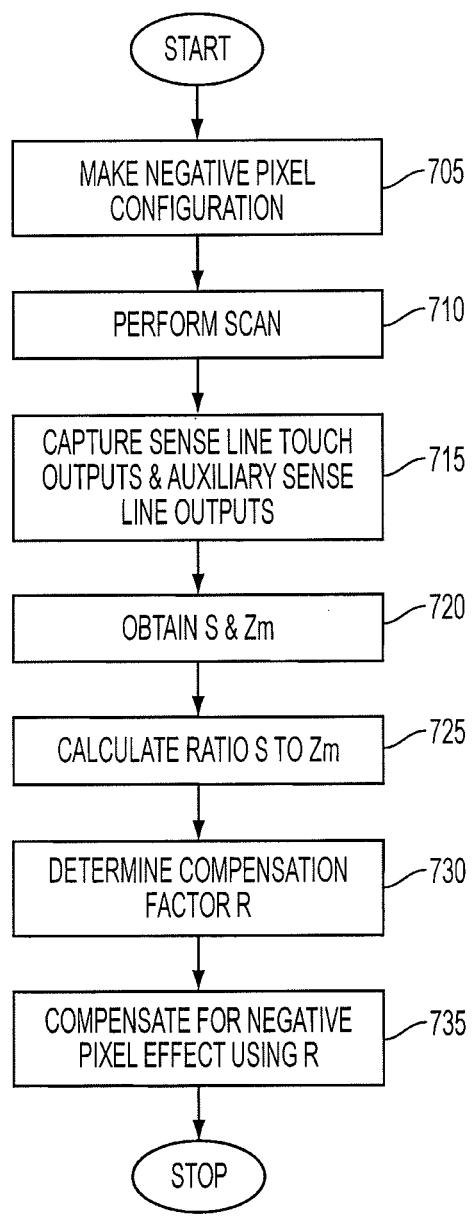
FIG. 7A illustrates an exemplary method for compensating for negative pixel effects on a touch sensor panel according to various embodiments.

FIG. 7A illustrates an exemplary method for compensating for negative pixel effects on a touch sensor panel according to various embodiments. In the example of FIG. 7A, a touch sensor panel can be configured for negative pixel configuration, e.g., as in FIG. 3, where each drive line can be configured to couple to a stimulation signal input when the drive line is to be stimulated, to couple to a sensor for sensing negative pixel effect signals when the drive line is to be used as an auxiliary sense line, and to couple to ground when the drive line is neither stimulated nor an auxiliary sense line (705). A scan can be performed at the panel, where multiple drive lines can be substantially simultaneously stimulated with a stimulation signal, each auxiliary sense line can transmit a negative pixel effect signal indicative of the capacitances Cfd along those drive lines, and each sense line can transmit a touch signal indicative of a touch at the panel (710). Alternatively, each drive line can be sequentially stimulated with a stimulation signal. The touch signals from the sense lines and the negative pixel effect signals from the auxiliary sense lines can be captured by their respective sense circuitry (715). Z can be obtained from the captured touch signals for each stimulated drive line. S can be obtained from the captured negative pixel effect signals for each stimulated drive line (720).

A sum ratio of S to Zm can be calculated for each stimulated drive line (725). A negative pixel effect compensation factor R can be calculated from the sum ratios, as in Equation (3) (730). R can then be used to compensate for the negative pixel effect at the pixels, as in Equation (2) (735).

Optionally, when the negative pixel effect detection configuration of FIG. 3 is done, a second negative pixel effect configuration as in FIG. 5 can be done. In the negative pixel effect detection configuration of FIG. 5, the drive lines can be switched with the sense lines such that the touch sensor panel rows can be sense lines and the panel columns can be drive lines. The drive lines (now in columns) can be configured to couple to a stimulation signal input when the drive line is to be stimulated, to couple to a sensor for sensing negative pixel effect signals when the drive line is to be used as an auxiliary sense line, and to couple to ground when the drive line is neither stimulated nor an auxiliary sense line. The sense lines (now in rows) can be configured to couple to ground. A scan can be performed at the panel, where one or more drive lines can be stimulated with a stimulation signal and each auxiliary sense line can transmit a negative pixel effect signal, indicative of the capacitances Cfd' along that line. The negative pixel effect signals from the auxiliary sense lines can be captured by the sense circuitry. S can be obtained from the captured negative pixel effect signals for each stimulated drive line. In some embodiments, where there is more than one S value for the same pixels, due to the two negative pixel effect scans, the S values can be averaged, for example, or otherwise correlated to get representative S values for those pixels.

Figure 7B:
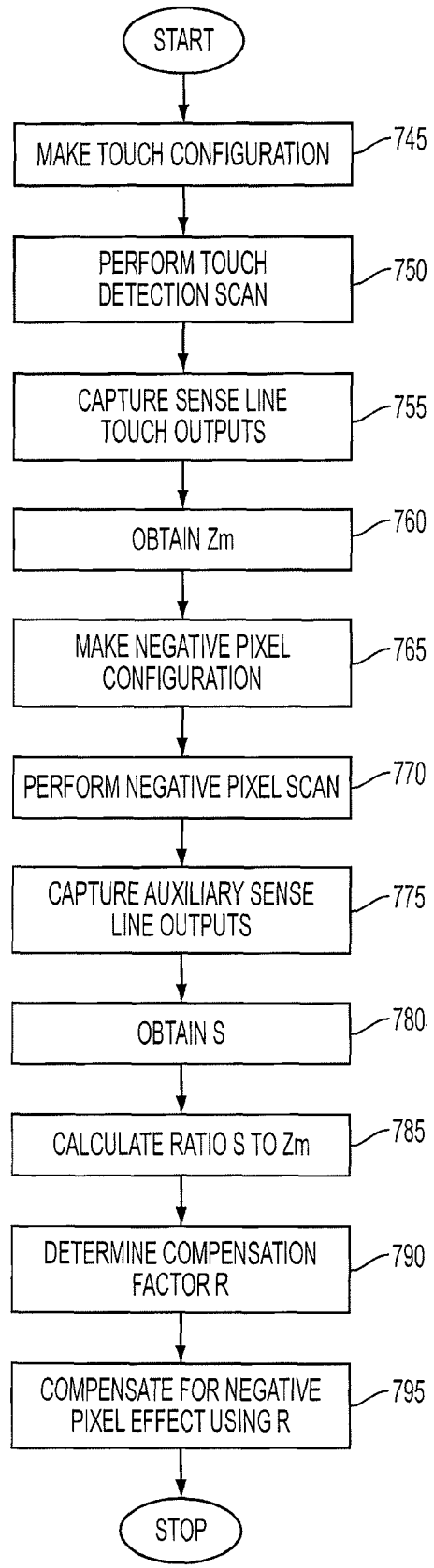
FIG. 7B illustrates another exemplary method for compensating for negative pixel effects on a touch sensor panel according to various embodiments.

FIG. 7B illustrates another exemplary method for compensating for negative pixel effects on a touch sensor panel according to various embodiments. In the example of FIG. 7B, a touch sensor panel can be configured for touch detection, e.g., as in FIG. 1, where each drive line can be configured to couple to a stimulation signal input when the drive line is to be stimulated and to couple to ground when the drive line is not to be stimulated and each sense line can be configured to couple to sense circuitry for sensing a touch at the panel (745). A scan can be performed at the panel, where multiple drive lines can be substantially simultaneously stimulated with a stimulation signal to capacitively couple with crossing sense lines and each sense line can transmit a touch signal indicative of a touch at the panel (750). Alternatively, each drive line can be sequentially stimulated with a stimulation signal. The touch signals from the sense lines can be captured by the sense circuitry (755). Zm can be obtained from the captured touch signals for each stimulated drive line (760).

The touch sensor panel can be configured for negative pixel effect detection, e.g., as in FIG. 3, where each drive line can be configured to couple to a stimulation signal input when the drive line is to be stimulated, to couple to a sensor for sensing negative pixel effect signals when the drive line is to be used as an auxiliary sense line, and to couple to ground when the drive line is neither stimulated nor an auxiliary sense line (765). A scan can be performed at the panel, where multiple drive lines can be substantially simultaneously stimulated with a stimulation signal and each auxiliary sense line can transmit a negative pixel effect signal, indicative of the capacitances Cfd along that line (770). Alternatively, each drive line can be sequentially stimulated with a stimulation signal. The negative pixel effect signals from the auxiliary sense lines can be captured by the sense circuitry (775). S can be obtained from the captured negative pixel effect signals for each stimulated drive line (780).

A sum ratio of S to Zm can be calculated for each stimulated drive line (785). A negative pixel effect compensation factor R can be calculated from the sum ratios, as in Equation (3) (790). R can then be used to compensate for the negative pixel effect at the pixels, as in Equation (2) (795).

Optionally, when the negative pixel effect detection configuration of FIG. 3 is done, a second negative pixel effect configuration as in FIG. 5 can be done. In the negative pixel effect detection configuration of FIG. 5, the drive lines can be switched with the sense lines such that the touch sensor panel rows can be sense lines and the panel columns can be drive lines. The drive lines (now in columns) can be configured to couple to a stimulation signal input when the drive line is to be stimulated, to couple to a sensor for sensing negative pixel effect signals when the drive line is to be used as an auxiliary sense line, and to couple to ground when the drive line is neither stimulated nor an auxiliary sense line. The sense lines (now in rows) can be configured to couple to ground. A scan can be performed at the panel, where each drive line can be sequentially stimulated with a stimulation signal and each auxiliary sense line can transmit a negative pixel effect signal, indicative of the capacitances Cfd along that line. The negative pixel effect signals from the auxiliary sense lines can be captured by the sense circuitry. S can be obtained from the captured negative pixel effect signals for each stimulated drive line. In some embodiments, where there is more than one S value for the same pixels, due to the two negative pixel effect scans, the S values can be averaged, for example, or otherwise correlated to get representative S values for those pixels.

In some embodiments, a negative pixel effect scan can be performed after every touch detection scan. In some embodiments, a negative pixel effect scan can be performed less frequently, e.g., after multiple touch detection scans. The frequency can depend on a number of factors associated with the panel.

It is to be understood that a method for compensating for negative pixel effect is not limited to those illustrated in FIGS. 7A and 7B, but can include other and/or additional actions capable of negative pixel compensation according to various embodiments.

Figure 8:
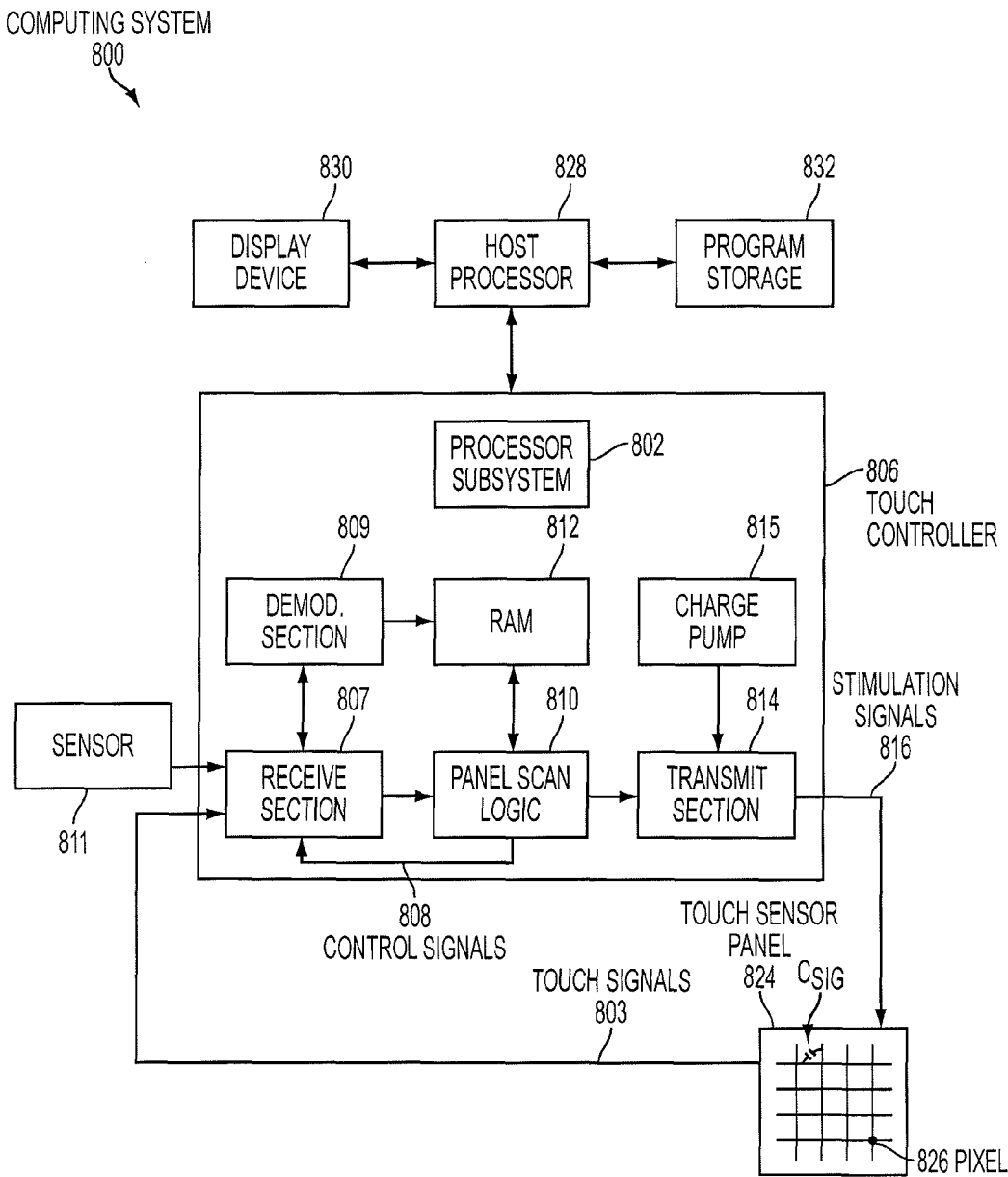
FIG. 8 illustrates an exemplary computing system that can compensate for negative pixel effects according to various embodiments.

FIG. 8 illustrates an exemplary computing system 800 that can measure a negative pixel effect in a touch sensor panel according to various embodiments described herein. In the example of FIG. 8, computing system 800 can include touch controller 806. The touch controller 806 can be a single application specific integrated circuit (ASIC) that can include one or more processor subsystems 802, which can include one or more main processors, such as ARM968 processors or other processors with similar functionality and capabilities. However, in other embodiments, the processor functionality can be implemented instead by dedicated logic, such as a state machine. The processor subsystems 802 can also include peripherals (not shown) such as random access memory (RAM) or other types of memory or storage, watchdog timers and the like. The touch controller 806 can also include receive section 807 for receiving signals, such as touch signals 803 of one or more sense channels (not shown), other signals from other sensors such as sensor 811, etc. The touch controller 806 can also include demodulation section 809 such as a multistage vector demodulation engine, panel scan logic 810, and transmit section 814 for transmitting stimulation signals 816 to touch sensor panel 824 to drive the panel. The panel scan logic 810 can access RAM 812, autonomously read data from the sense channels, and provide control for the sense channels. In addition, the panel scan logic 810 can control the transmit section 814 to generate the stimulation signals 816 at various frequencies and phases that can be selectively applied to rows of the touch sensor panel 824.

The touch controller 806 can also include charge pump 815, which can be used to generate the supply voltage for the transmit section 814. The stimulation signals 816 can have amplitudes higher than the maximum voltage by cascading two charge store devices, e.g., capacitors, together to form the charge pump 815. Therefore, the stimulus voltage can be higher (e.g., 6V) than the voltage level a single capacitor can handle (e.g., 3.6 V). Although FIG. 8 shows the charge pump 815 separate from the transmit section 814, the charge pump can be part of the transmit section.

Touch sensor panel 824 can include a capacitive sensing medium having row traces (e.g., drive lines) and column traces (e.g., sense lines), although other sensing media can also be used. The row and column traces can be formed from a transparent conductive medium such as Indium Tin Oxide (ITO) or Antimony Tin Oxide (ATO), although other transparent and non-transparent materials such as copper can also be used. In some embodiments, the row and column traces can be perpendicular to each other, although in other embodiments other non-Cartesian orientations are possible. For example, in a polar coordinate system, the sense lines can be concentric circles and the drive lines can be radially extending lines (or vice versa). It should be understood, therefore, that the terms "row" and "column" as used herein are intended to encompass not only orthogonal grids, but the intersecting traces of other geometric configurations having first and second dimensions (e.g. the concentric and radial lines of a polar-coordinate arrangement). The rows and columns can be formed on, for example, a single side of a substantially transparent substrate separated by a substantially transparent dielectric material, on opposite sides of the substrate, on two separate substrates separated by the dielectric material, etc.

At the "intersections" of the traces, where the traces pass above and below (cross) each other (but do not make direct electrical contact with each other), the traces can essentially form two electrodes (although more than two traces can intersect as well). Each intersection of row and column traces can represent a capacitive sensing node and can be viewed as picture element (pixel) 826, which can be particularly useful when the touch sensor panel 824 is viewed as capturing an "image" of touch. (In other words, after the touch controller 806 has determined whether a touch event has been detected at each touch sensor in the touch sensor panel, the pattern of touch sensors in the multi-touch panel at which a touch event occurred can be viewed as an "image" of touch (e.g. a pattern of fingers touching the panel).) The capacitance between row and column electrodes can appear as a stray capacitance Cstray when the given row is held at direct current (DC) voltage levels and as a mutual signal capacitance Csig when the given row is stimulated with an alternating current (AC) signal. The presence of a finger or other object near or on the touch sensor panel can be detected by measuring changes to a signal charge Qsig present at the pixels being touched, which can be a function of Csig. The signal change Qsig can also be a function of a capacitance Cbody of the finger or other object to ground, as will be described in more detail later.

Computing system 800 can also include host processor 828 for receiving outputs from the processor subsystems 802 and performing actions based on the outputs that can include, but are not limited to, moving an object such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. The host processor 828 can also perform additional functions that may not be related to panel processing, and can be coupled to program storage 832 and display device 830 such as an LCD display for providing a UI to a user of the device. In some embodiments, the host processor 828 can be a separate component from the touch controller 806, as shown. In other embodiments, the host processor 828 can be included as part of the touch controller 806. In still other embodiments, the functions of the host processor 828 can be performed by the processor subsystem 802 and/or distributed among other components of the touch controller 806. The display device 830 together with the touch sensor panel 824, when located partially or entirely under the touch sensor panel or when integrated with the touch sensor panel, can form a touch sensitive device such as a touch screen.

A negative pixel effect can be determined by the processor in subsystem 802, the host processor 828, dedicated logic such as a state machine, or any combination thereof according to various embodiments.

Note that one or more of the functions described above can be performed, for example, by firmware stored in memory (e.g., one of the peripherals) and executed by the processor subsystem 802, or stored in the program storage 832 and executed by the host processor 828. The firmware can also be stored and/or transported within any computer readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer readable storage medium" can be any medium that can contain or store the program for use by or in connection with the instruction execution system, apparatus, or device. The computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

It is to be understood that the touch sensor panel is not limited to touch, as described in FIG. 8, but can be a proximity panel or any other panel according to various embodiments. In addition, the touch sensor panel described herein can be either a single-touch or a multi-touch sensor panel.

It is further to be understood that the computing system is not limited to the components and configuration of FIG. 8, but can include other and/or additional components in various configurations capable of measuring a negative pixel effect according to various embodiments.

Figure 9:
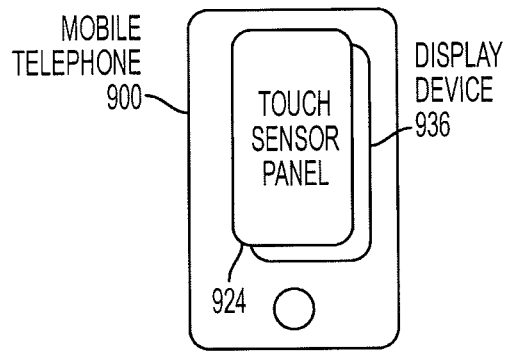
FIG. 9 illustrates an exemplary mobile telephone that can compensate for negative pixel effects according to various embodiments.

FIG. 9 illustrates an exemplary mobile telephone 900 that can include touch sensor panel 924, display 936, and other computing system blocks that can perform negative pixel compensation according to various embodiments.

Figure 10:
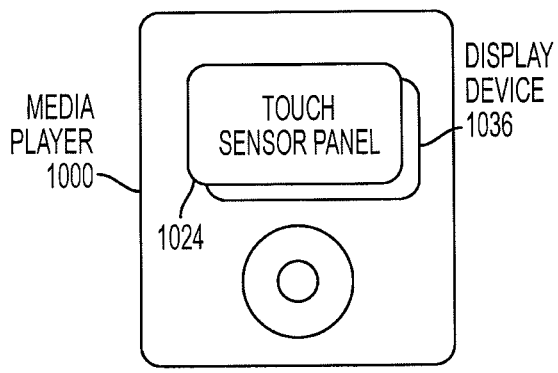
FIG. 10 illustrates an exemplary digital media player that can compensate for negative pixel effects according to various embodiments.

FIG. 10 illustrates an exemplary digital media player 1000 that can include touch sensor panel 1024, display 1036, and other computing system blocks that can perform negative pixel compensation according to various embodiments.

Figure 11:
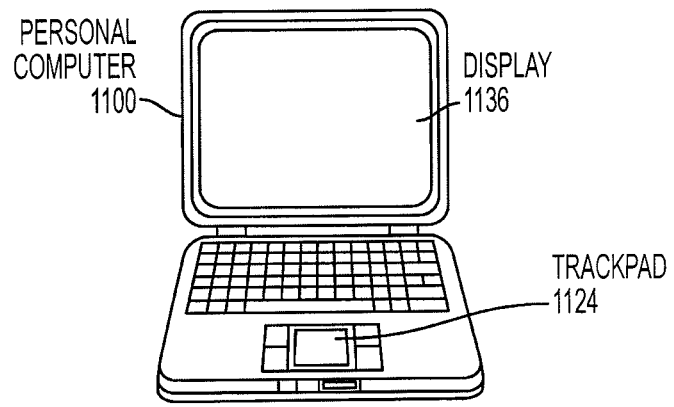
FIG. 11 illustrates an exemplary personal computer that can compensate for negative pixel effects according to various embodiments.

FIG. 11 illustrates an exemplary personal computer 1100 that can include touch sensor panel (trackpad) 1124, display 1136, and other computing system blocks that can perform negative pixel compensation according to various embodiments.

The mobile telephone, media player, and personal computer of FIGS. 9 through 11 can realize power savings, improved accuracy, faster speed, and more robustness by compensating for a negative pixel effect according to various embodiments.

Although embodiments have been fully described with reference to the accompanying drawings, it is to be noted that various changes and modifications will become apparent to those skilled in the art. Such changes and modifications are to be understood as being included within the scope of the various embodiments as defined by the appended claims.

What is claimed is:

1. A circuit comprising:
multiple first lines, each first line configured to be switchable;
multiple second lines configured to associate with the first lines;
switching circuitry coupled to at least the first lines and configured to operate the circuit in a configuration for measuring a grounding condition of an object proximate to the circuit by switching at least one of the first lines to transmit a stimulation signal and at least another of the first lines to sense a capacitance signal indicative of the grounding condition of the object; and
a processing unit configured to compensate a touch signal based on a compensation factor, wherein the compensation factor is a function of the measured grounding condition and a mutual capacitance of the first lines that transmit a stimulation signal to a plurality of sense lines.

2. The circuit of claim 1, wherein the configuration includes the switching circuitry coupling the remaining first lines to ground.

3. The circuit of claim 1, wherein the configuration includes the switching circuitry coupled to the second lines, the switching circuitry switching the second lines to function as the first lines and the first lines to function as the second lines.

4. The circuit of claim 1, wherein the configuration includes the switching circuitry coupled to the second lines, the switching circuitry coupling the second lines to ground.

5. The circuit of claim 1, wherein the switching circuitry is configured to switch the first lines between multiple couplings, the multiple couplings including at least one of a coupling to stimulation signal input circuitry, a coupling to capacitive signal output circuitry, or a coupling to ground.

6. The circuit of claim 1, wherein the switching circuitry is coupled to the second lines and configured to switch the second lines between multiple couplings, the multiple couplings including at least one of a coupling to touch sensing circuitry or a coupling to ground.

7. The circuit of claim 1, wherein the configuration is further for measuring a touch of the object at the circuit by switching at least a third of the first lines to couple to ground and by at least one of the second lines transmitting a touch signal indicative of the touch of the object at the circuit.

8. The circuit of claim 1, wherein the first lines comprise drive lines and the second lines comprise sense lines.

9. The circuit of claim 1 incorporated into at least one of a mobile telephone, a digital media player, or a personal computer.

10. A circuit comprising:
multiple first lines, at least one of the first lines being configured to drive the circuit with a stimulation signal and at least one other first line being configured to sense a first capacitance between an object proximate to the circuit and ground;
multiple second lines associated with to the first lines to form pixels and configured to sense a second capacitance at the pixels indicative of a touch by the object; and
a processor programmable for compensating the second capacitance with the first capacitance based on a grounding condition of the object;
wherein a compensation factor is a function of the measured grounding condition and a mutual capacitance of the multiple first lines that transmit a stimulation signal to a plurality of sense lines.

11. The circuit of claim 10, wherein the first lines are numbered, the first line configured to drive the circuit has a first number, and the first lines configured to sense the first capacitance are even numbered first lines lower than the first number and odd numbered first lines higher than the first number.

12. The circuit of claim 10, wherein the first lines configured to sense the first capacitance are the first lines disposed on the circuit below the first line configured to drive the circuit.

13. The circuit of claim 10, wherein the first lines configured to sense the first capacitance are the first lines disposed on the circuit above the first line configured to drive the circuit.

14. A method comprising:
configuring at least one drive line of a touch sensitive device having multiple drive and sense lines to receive a stimulation signal;
configuring at least one other drive line to sense a grounding condition of an object touching the device; and
compensating sense signals detected on one or more sense lines based on the sensed grounding condition;
wherein a compensation factor is a function of the measured grounding condition and a mutual capacitance of the multiple first lines that transmit a stimulation signal to a plurality of sense lines.

15. The method of claim 14, comprising: configuring at least a third drive line to couple to ground.

16. The method of claim 14, wherein compensating the sense signals comprises calculating a ratio between a signal indicative of the sensed grounding condition and an estimate based on at least one sense signal of the grounding condition.

17. The method of claim 16, wherein compensating the sense signals comprises determining a the compensation factor is based on the calculated ratio.

18. The method of claim 17, wherein compensating the sense signals comprises: calculating a compensation touch value based on the compensation factor; and subtracting the compensation touch value from the sense signals.

19. A touch sensor panel comprising:
multiple drive lines, at least one of the drive lines being switchably configured to receive a stimulation signal to drive the panel, a group of other drive lines being switchably configured to measure a proximate object capacitance generated by the driving of the stimulation signal, the measured capacitance indicative of a grounding condition of the object;
multiple sense lines configured to associate with the drive lines and transmit touch signals indicative of a touch by the object at the panel; and
switching circuitry coupled to the drive lines and configured to switch the drive lines; and
a processor configured to compensate the touch signals with the measured capacitance;
wherein the measured capacitance is used in determining a compensation factor that is a function of the measured capacitance and a mutual capacitance of the multiple drive lines that transmit a stimulation signal to the multiple sense lines.

20. The panel of claim 19, comprising multiple pixels formed by crossings of the drive lines and the sense lines, the pixels being configured to receive the touch by the object, the receiving touch comprising multiple simultaneous touches by the object, and the touch signals comprising touch information to be compensated for by the measured capacitance.

21. A touch sensitive device comprising:
a touch sensor panel configured to sense an object proximate thereto and switchable to have at least one drive line of the of the panel coupled to a stimulation signal supply to drive the panel, at least another of the drive lines of the panel coupled to a sensor to sense the object grounding, and at least one sensor line of the panel coupled to a sensor to sense the object touch concurrently with the object grounding;
scan logic couplable to the touch sensor panel and configured to perform a scan sequence on the panel to measure a touch by the object at the panel and to measure grounding of the object; and
a processor configured to compensate touch measurements according to grounding measurements;
wherein the grounding measurements are used in determining a compensation factor that is a function of the measured capacitance and a mutual capacitance of the multiple drive lines that transmit a stimulation signal to the multiple sense lines.

22. The device of claim 21, wherein the device measures the touch and the grounding concurrently, the touch sensor panel switching to a configuration comprising at least one drive line of the panel coupled to a stimulation signal supply to drive the panel, at least another of the drive lines of the panel coupled to a sensor to sense the object grounding, and at least one sense line of the panel coupled to a sensor to sense the object touch.

23. The device of claim 21, wherein the touch sensor panel switches between a first configuration to measure the touch and a second configuration to measure the grounding, the first configuration comprising at least one drive line of the panel coupled to a stimulation signal supply to drive the panel, at least another of the drive lines of the panel coupled to ground, and at least one sense line of the panel coupled to a sensor to sense the object touch, and the second configuration comprising at least one drive line of the panel coupled to the stimulation signal supply to drive the panel and at least another of the drive lines of the panel coupled to a sensor to sense the object grounding.

24. The device of claim 21, wherein the scan sequence comprises a first scan to measure the touch and a second scan to measure the grounding.

\* \* \* \* \*